US006526341B1

(12) United States Patent
Bird et al.

(10) Patent No.: US 6,526,341 B1
(45) Date of Patent: Feb. 25, 2003

(54) PAPERLESS LOG SYSTEM AND METHOD

(75) Inventors: James B. Bird, Battlefield, MO (US); R. Lee Easton, Omaha, NE (US); Eugene Hansohn, Omaha, NE (US); Duane D. Henn, Papillion, NE (US); Kirk Hooten, Des Moines, IA (US); John Jensen, Omaha, NE (US); Terri Mauldin, Omaha, NE (US); Glenn A. Novotny, Papillion, NE (US); Alan G. Urwin, LaVista, NE (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/363,972

(22) Filed: Jul. 29, 1999

Related U.S. Application Data

(60) Provisional application No. 60/138,361, filed on Jun. 10, 1999.

(51) Int. Cl.[7] .......... H04M 1/65

(52) U.S. Cl. .......... 701/35; 701/33; 455/412; 455/401

(58) Field of Search .......... 701/33, 35, 36, 701/208, 207, 209; 455/412, 401

(56) References Cited

U.S. PATENT DOCUMENTS

| | | | | | |
|---|---|---|---|---|---|
| 3,974,568 | A | * | 8/1976 | Linderman | 33/486 |
| 4,338,512 | A | * | 7/1982 | Ludwig | 377/20 |
| 4,644,368 | A | * | 2/1987 | Mutz | 346/33 D |
| 4,804,937 | A | * | 2/1989 | Barbiaux et al. | 340/459 |
| 4,850,614 | A | * | 7/1989 | Shanahan et al. | 462/8 |
| 4,926,331 | A | * | 5/1990 | Windle et al. | 701/35 |
| 5,046,007 | A | * | 9/1991 | McCrery et al. | 364/424.04 |
| 5,513,111 | A | * | 4/1996 | Wortham | 455/456 |
| 5,541,858 | A | * | 7/1996 | Warner | 364/561 |
| 5,724,243 | A | * | 3/1998 | Westerlage et al. | 455/456 |
| 5,740,548 | A | * | 4/1998 | Hudgens | 701/35 |
| 5,832,394 | A | * | 11/1998 | Wortham | 701/1 |
| 5,862,500 | A | * | 1/1999 | Goodwin | 701/35 |
| 5,919,239 | A | * | 7/1999 | Fraker et al. | 701/35 |
| 5,974,356 | A | * | 10/1999 | Doyle et al. | 701/209 |
| 5,987,378 | A | * | 11/1999 | Schipper et al. | 701/207 |
| 6,055,478 | A | * | 4/2000 | Heron | 701/213 |
| 6,064,929 | A | * | 5/2000 | Migues et al. | 701/35 |
| 6,073,007 | A | * | 6/2000 | Doyle | 455/412 |
| 6,108,591 | A | * | 8/2000 | Segal et al. | 701/1 |
| 6,185,484 | B1 | * | 2/2001 | Rhinehart | 701/1 |
| 6,285,953 | B1 | * | 9/2001 | Harrison et al. | 701/213 |
| 6,351,695 | B1 | * | 2/2002 | Weiss | 701/35 |

* cited by examiner

*Primary Examiner*—William A. Cuchlinski, Jr.
*Assistant Examiner*—Marthe Y. Marc-Coleman
(74) *Attorney, Agent, or Firm*—Philip R. Wadsworth; Gregory D. Ogrod; Thomas M. Thibault

(57) ABSTRACT

A method and apparatus for automatically creating and maintaining driver activity logs for vehicle operators. The vehicle operator is in communication with a central station using a mobile communication terminal located onboard an assigned vehicle. A vehicle operator driving status is determined at the central station when messages and position reports are transmitted from the vehicle to the central station. A driver activity log is created upon request by the vehicle operator or by authorized personnel at the central station or host facility. The driver activity log may then be transmitted to the vehicle for display.

12 Claims, 5 Drawing Sheets

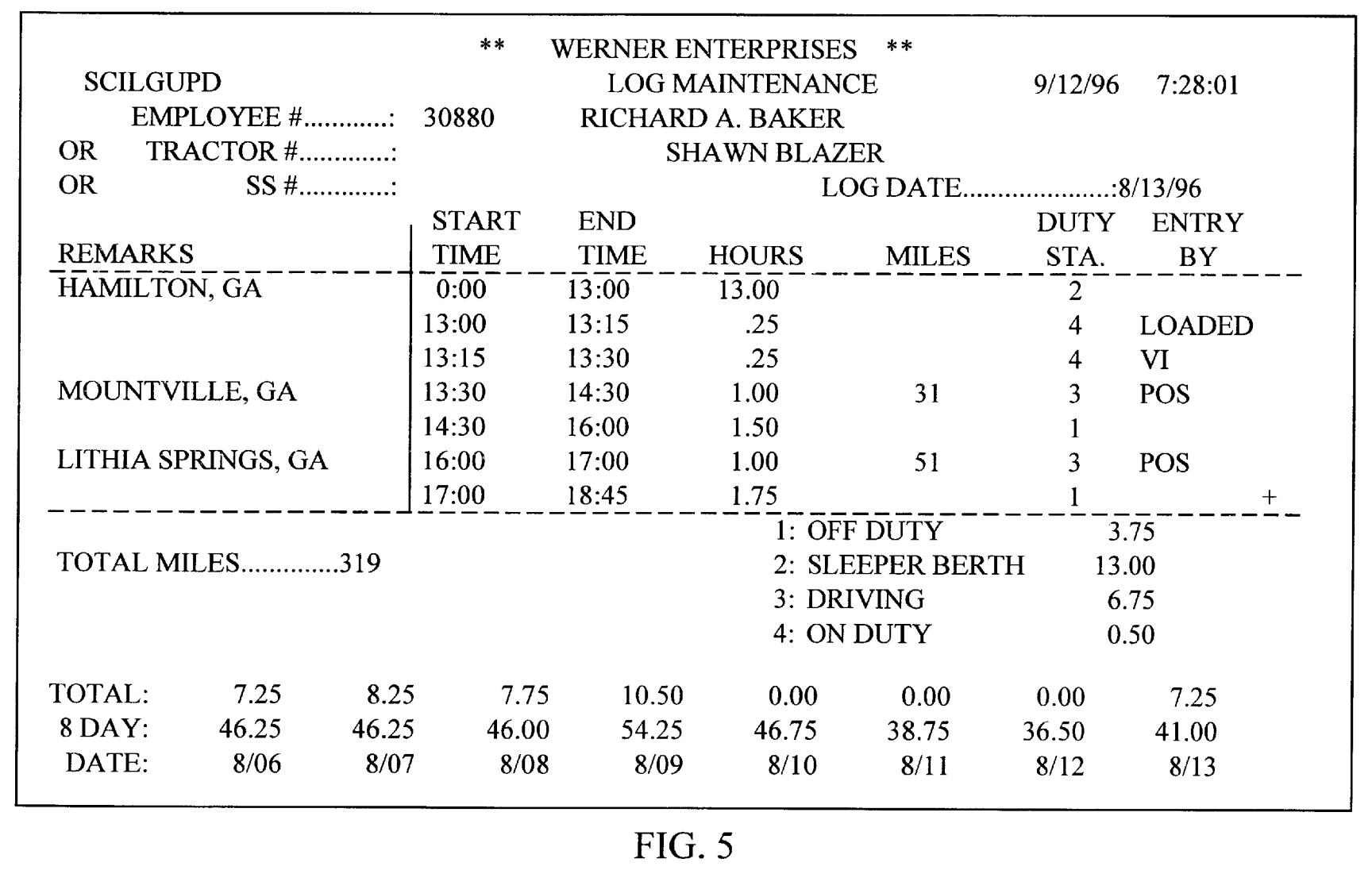

WERNER ENTERPRISES

SCILGUPD LOG MAINTENANCE 9/12/96 7:28:01

EMPLOYEE #............: 30880 RICHARD A. BAKER

OR TRACTOR #.............: SHAWN BLAZER

OR SS #.............: LOG DATE.....................:8/13/96

| REMARKS | START TIME | END TIME | HOURS | MILES | DUTY STA. | ENTRY BY |
|---|---|---|---|---|---|---|
| HAMILTON, GA | 0:00 | 13:00 | 13.00 | | 2 | |
| | 13:00 | 13:15 | .25 | | 4 | LOADED |
| | 13:15 | 13:30 | .25 | | 4 | VI |
| MOUNTVILLE, GA | 13:30 | 14:30 | 1.00 | 31 | 3 | POS |
| | 14:30 | 16:00 | 1.50 | | 1 | |
| LITHIA SPRINGS, GA | 16:00 | 17:00 | 1.00 | 51 | 3 | POS |
| | 17:00 | 18:45 | 1.75 | | 1 | + |

TOTAL MILES..............319

| | |
|---|---|
| 1: OFF DUTY | 3.75 |
| 2: SLEEPER BERTH | 13.00 |
| 3: DRIVING | 6.75 |
| 4: ON DUTY | 0.50 |

| | | | | | | | | |
|---|---|---|---|---|---|---|---|---|
| TOTAL: | 7.25 | 8.25 | 7.75 | 10.50 | 0.00 | 0.00 | 0.00 | 7.25 |
| 8 DAY: | 46.25 | 46.25 | 46.00 | 54.25 | 46.75 | 38.75 | 36.50 | 41.00 |
| DATE: | 8/06 | 8/07 | 8/08 | 8/09 | 8/10 | 8/11 | 8/12 | 8/13 |

FIG. 5

PAPERLESS LOG SYSTEM AND METHOD

This application claims the benefit of No. 60/138,361 filed Jun. 10, 1999.

BACKGROUND OF THE INVENTION

I. Field of the Invention

The present invention relates generally to the transportation industry and more particularly to a method and apparatus for automatically creating and maintaining driver activity logs for vehicle operators.

II. Description of the Related Art

Truck drivers across the United States presently operate under regulations promulgated by the Department of Transportation (DOT) and the Federal Highway Administration (FHWA). The DOT and FHWA regulate many aspects of the transportation industry ranging from vehicle maintenance to substance abuse. One of the more important areas that the DOT and FHWA monitor is the occurrence of truck-related accidents and ways to reduce the number of such accidents.

Driver fatigue has been cited by the DOT and FHWA as being one of the primary causes of truck-related accidents. Consequently, the FHWA has adopted regulations that limit the number of hours that truck drivers may operate a vehicle over a given time period. For example, the DOT prohibits any driver from driving a commercial vehicle in excess of 10 hours after 8 hours of rest.

To ensure compliance with these safety regulations, the FHWA also requires drivers to keep detailed written records of the number of hours driving, on-duty but not driving, resting, and off-duty. Drivers must provide daily updates into a logbook carried with the driver, detailing the number of hours spent in each of the four categories mentioned above. Other information may be required as well, such as the location of where the log book entry occurred, a vehicle identification number, the name of the nearest city at the time of a logbook entry, and so on. A driver must make entries into the log book each time he/she begins driving, stops driving, starts or ends an "on-duty but not operating the vehicle" state, and starting or ending a "rest" state. Drivers must chart their hours and activities every day by drawing lines on a grid in the log book and calculating the number of hours driving, on-duty but not driving, resting, and off duty, over a twenty four hour period.

Federal officials periodically inspect driver logbooks at weigh stations and other locations to certify that they have been kept up-to-date by the driver, and that the driver is following the FHWA mandated regulations. If a driver is found to be out of compliance with the FHWA regulations, he or she will not be permitted to continue driving until the proper amount of off-duty or rest time has elapsed. This results in late deliveries to customers and general inefficiency for the driver's employer. The driver is also penalized because the mandated "rest" time affects the hours that he/she is able to work. If a number of violations occur over a given time period, substantial fines may be levied against the driver and/or employers.

The logbooks are a nuisance for drivers to fill out and keep current. Consequently, entries are often neglected until well after the time they were supposed to be entered. This may result in erroneous entries, since the driver must rely on memory as to the timing of recordable events. Inaccurate entries into the logbook may be discovered during an audit of the carrier's records by FHWA officials months, or even years, later.

The logbooks are also susceptible to intentional misrepresentation by vehicle operators. Commercial vehicle operators are sometimes paid by the number of loads delivered, so there is a great incentive for operators to intentionally under-report the hours that they have driven, or to over-report the number of rest hours between driving periods.

What is needed is a way to ensure compliance with safety regulations without the problems associated with the present method for doing so.

SUMMARY OF THE INVENTION

It is an object of the present invention to automatically create and maintain driver log records for vehicle operators without the vehicle operator having to fill out complex logbooks and chart their activities.

It is a further object of the present invention to reduce the inconvenience to vehicle operators having to manually record and calculate work hours and activities in a logbook and to keep the logbook up to date.

It is yet another object of the present invention to reduce the number of deliberate and inadvertent safety violations by vehicle operators.

It is still a further object of the present invention to improve driver retention and recruitment by decreasing the chances of problematic roadside inspections and reducing the delays associated with such inspections.

It is still another object of the present invention to allow carriers to track operator hours worked and operator hours available to haul other loads. Carriers can monitor these hours, identify load delivery problems, and make adjustments for on-time delivery, such as swapping loads with other vehicle operators who have available hours.

It is another object of the present invention to keep shippers apprised of load delivery schedules. Carriers can more closely determine a vehicle operator's ability to meet delivery schedules based on hours worked and the hours available for vehicle operation.

The present invention is a system and method for automatically creating and maintaining driver activity logs, eliminating the need for vehicle operators to manually record and calculate this data.

In a first embodiment of the present invention, driver activity logs are created and maintained at a central station. Vehicle operators are in communication with the central station using a mobile communication terminal located on a vehicle. The mobile communication terminal allows the vehicle operator to send messages from the vehicle to a central station and to report the location of the vehicle. Messages are generally sent by the vehicle operator upon the occurrence of predefined events, such as arrival or departure from a consignee, or the start and end of a driving shift. In the exemplary embodiment, each message allows the central station to determine the position of the vehicle at the time that messages were transmitted. Messages and position information are received by the central station where a vehicle operator driving state is determined, based on the message type, the current position of the vehicle, a current date and time that the current vehicle position was determined, a previous vehicle position, and a previous date and time that the previous vehicle position was determined. A current log record is then created, or a previous log record is updated to reflect an extension of the driving state in the previous driving record. A driver activity log is generated upon request by the vehicle operator or by authorized personnel at the central station or a host station. The driver active log is generated from previous log records and can be transmitted to the vehicle or displayed locally at the central station or host facility.

In a second embodiment of the present invention, driver active logs are created and maintained onboard a vehicle. Messages are entered by a vehicle operator into a mobile communication terminal for transmission. A position location device located onboard the vehicle provides a current vehicle position. In the exemplary embodiment, a current vehicle position is determined each time a message is transmitted by the mobile communication terminal, as well as at predetermined time intervals. Each time a message is transmitted, or a current vehicle position is determined, a current operator driving state is determined, based on the message type, the current position of the vehicle, a current date and time that the current vehicle position was determined, a previous vehicle position, and a previous date and time that the previous vehicle position was determined. A current log record is then created, or a previous log record is updated to reflect an extension of the driving state in the previous driving record. A driver activity log is generated upon request by the vehicle operator or by authorized personnel at the central station or a host facility. The driver active log is generated from previous log records and can be transmitted to the central station or host facility, or be displayed locally at the vehicle.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 is an illustration of a typical driver activity log of the present invention.

DETAILED DESCRIPTION OF THE PREFERRED EMBODIMENTS

The present invention is a method and apparatus for automatically recording and calculating activity log records for use in the transportation industry. The invention is described in the context of a commercial tractor-trailer vehicle having a mobile communication terminal in communication with a central station using a satellite-based communication system. However, it should be understood that the present invention may be used in terrestrial-based wireless communication systems as well, such as cellular telephone systems, including Advanced Mobile Phone System (AMPS), Time Division Multiple Access (TDMA), Frequency Division Multiple Access (FDMA), Code Division Multiple Access (CDMA), or Global System for Mobile Communication (GSM) systems. Furthermore, the present invention may be used in a variety of vehicles, such as commercial trucks, busses, passenger vehicles, railcars, marine vessels, or airplanes.

Figure 1:
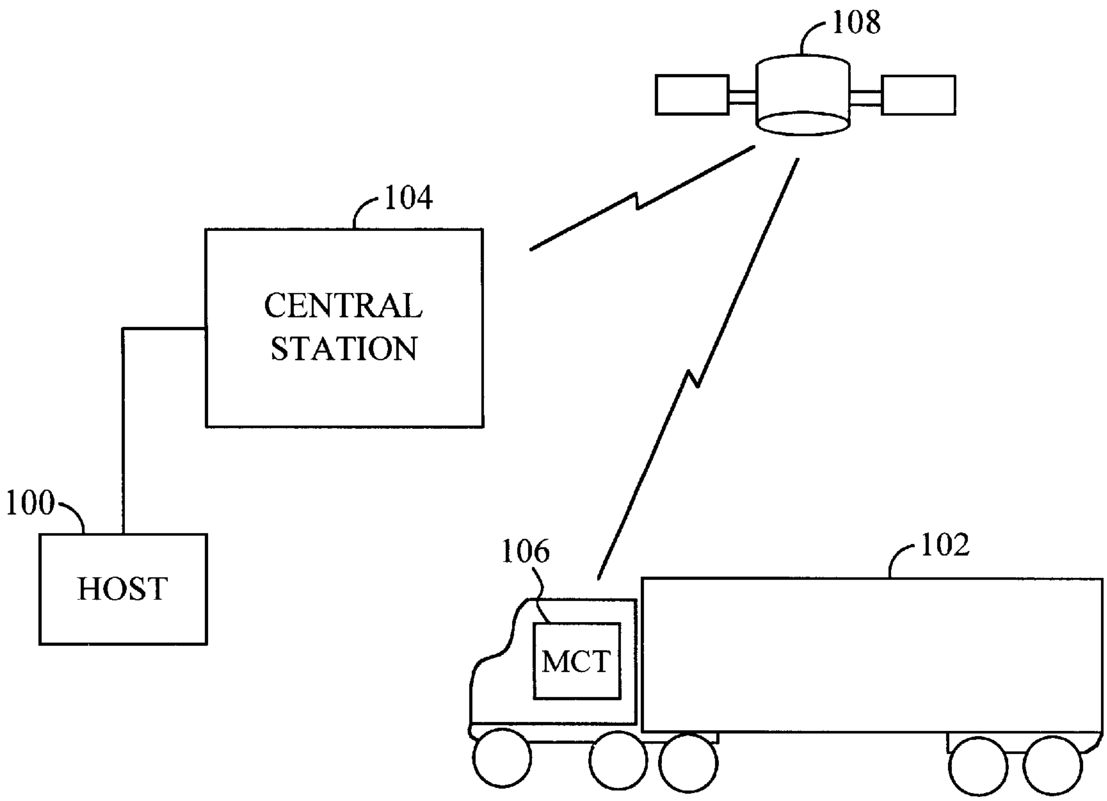
FIG. 1 is an illustration of a wireless communication system in which the present invention is used.

FIG. 1 is an illustration of a wireless communication system in which the present invention is used. Information is communicated between host facility (or host) 100 and ultimately vehicle 102 in the form of voice and/or data communications. Host 100 communicates information to central station 104 using well known communication channels, such as wireline or wireless telephone channels, fiber optic channels, or the like. Host 100 is typically a freight transportation company, otherwise known as a carrier, owning a large fleet of vehicles that are widely dispersed over a large geographic area. Typically, each vehicle comprises a mobile communication terminal 106, enabling communications with host 100 by way of satellite 108 and central station 104. Although only one host 100 and one vehicle 102 is shown in FIG. 1, in practice, many hosts 100 use central station 104 to communicate information to and from their respective fleet vehicles.

The information sent by host 100 to central station 104 may comprise voice or data information that is directed to one or more vehicles in the communication system. Information may also originate from central station 104 independently of host 100. In the case of information being transmitted from host 100, central station 104 receives the information and attempts to forward it to the identified vehicle or vehicles, as the case may be. The particular vehicle or vehicles for which the message is intended is identified by specifying an alpha-numeric code, typically a code corresponding to a serial number which has been pre-assigned to mobile communication terminal 106 installed on vehicle 102. However, any known method may be used to uniquely identify vehicles in the communication system.

In the exemplary embodiment, the position of vehicle 102 is provided to central station 104 at predetermined time intervals, such as once per hour, and is commonly referred to as a position report. The position of vehicle 102 may be provided generally in one of two ways. In the exemplary embodiment, the position of vehicle 102 is determined at central station 104 using a dual satellite tracking system as detailed in U.S. Pat. No. 5,017,926 entitled DUAL SATELLITE NAVIGATION SYSTEM, assigned to the assigned of the present invention and incorporated by reference herein. In the '926 patent, the position of vehicle 102 is determined by a timing difference between a transmitted signal from vehicle 102 to central station 104 using satellite 108 and a ranging satellite (not shown). The transmitted signal can be either a typical voice or text message or it can be a signal specifically transmitted to determine position, otherwise known as a "ping". Therefore, the vehicle position can be determined by receipt of transmitted messages or by receiving a "ping".

Another method for providing the vehicle position to central station 104 is to use an on-board vehicle positioning device, such as a Global Positioning System (GPS). GPS systems are well-known in the art for providing accurate, real time position information, generally in the form of latitude and longitude coordinates, to a GPS receiver located onboard vehicle 102. The position of vehicle 102 as provided by the GPS receiver is transmitted to central station 104 at predetermined intervals. The GPS information may be transmitted alone, or it may be appended to voice or text messages.

In the exemplary embodiment, data is transmitted between vehicle 102 and central station 104 using predefined messages called macros. Each macro is a predefined "template" which contains blank information fields to be filled out by the vehicle operator or a central station employee, as the case may be. The advantage of using macros in a wireless communication system is a reduction in message length, corresponding to a decrease in messaging costs. For example, in the exemplary embodiment, a predefined macro 01 looks like:

I HAVE RECEIVED LOAD INFORMATION AND ON MY WAY. ETA TO SHIPPER IS: DATE_____TIME:_____. I HAVE TRAILER_______, LICENCE NUMBER________. I NEED DIRECTIONS TO NEXT STOP Y/N__.

Rather than transmitting the entire text message above, a vehicle operator simple enters information in the blank fields, and transmits only the information contained within the fields, along with a macro identification number that indicates to central station 104 that the information contained within the present message corresponds to macro 01. At central station 104, the information is extracted from the received message in accordance with the structure of the 01 macro. Many other macros are used in modern satellite communication systems today, including macros which indicate arrival at a consignee, vehicle stuck in traffic, trailer loaded, trailer unloaded, and so on.

When a vehicle operator desires to transmit a macro message, one of the predefined macros is chosen, and any blank fields contained within the macro are filled with the appropriate information by the vehicle operator, or automatically by MCT 106. For example, the vehicle's current position may be automatically entered by processor 306 after obtaining location information from position location device 312, and appending the location information to the macro message. Position location device 312 may be any device well-known in the art for determining the location of a vehicle, such as a device based on the well-known Global Position System (GPS).

After the blank fields of the macro message have been completed, the message is formatted into an appropriate transmission protocol by processor 306, then transmitted to central station 104 using transceiver 300. Transceiver 300 may be any well known device capable of wireless communication with central station 104, such as a Land Mobile Radio (LMR) or, in the exemplary embodiment, a satellite transceiver as used in the OmniTRACS® mobile communication terminal manufactured by the assignee of the present invention.

Other information may be appended to the transmission as well. For example, the vehicle speed as provided by speedometer 316, an odometer reading as provided by odometer 314, or the current time as provided by time indicator 304, could be appended to the transmitted message.

As stated earlier, vehicle 102, in the exemplary embodiment, comprises a tractor-trailer vehicle widely used in the long-haul transportation industry. In the United States, tractor-trailers are the primary method for the transportation of goods. The commercial transportation industry is regulated by the Department of Transportation (DOT) and the Federal Highway Administration (FHWA), two regulatory agencies created by the United States federal government to ensure safe operation of commercial vehicles on the nation's highways. The DOT and FHWA has determined that many accidents involving commercial vehicles are the result of driver fatigue caused by too many uninterrupted hours of driving. In order to ensure that drivers obtain necessary breaks from continuous driving, the FHWA has established regulations which dictate the number of continuous hours that a vehicle operator may drive, the number of hours of rest required between shifts, and other safety-related criteria.

To ensure compliance with the FHWA regulations, commercial vehicle operators are required to record their daily activities in a logbook, tracking the number of hours that they spend driving, resting, and so on. Under current FHWA regulations, drivers must record the time at which they begin driving, the time at which they stop driving, the time they begin rest, the time that rest terminates, etc. Every 24 hours, vehicle operators must calculate the number of hours spent driving, the number of hours spent on-duty but not driving (i.e., the non-driving partner in a two person driving team), the number of hours resting, and the number of hours spent off-duty. In addition to this, drivers must also chart their activities on a graph, for example, a graph similar to one shown in FIG. 2. Commercial vehicle operators must perform this task every twenty four hours or risk a FHWA violation for non-compliance.

Figure 2:
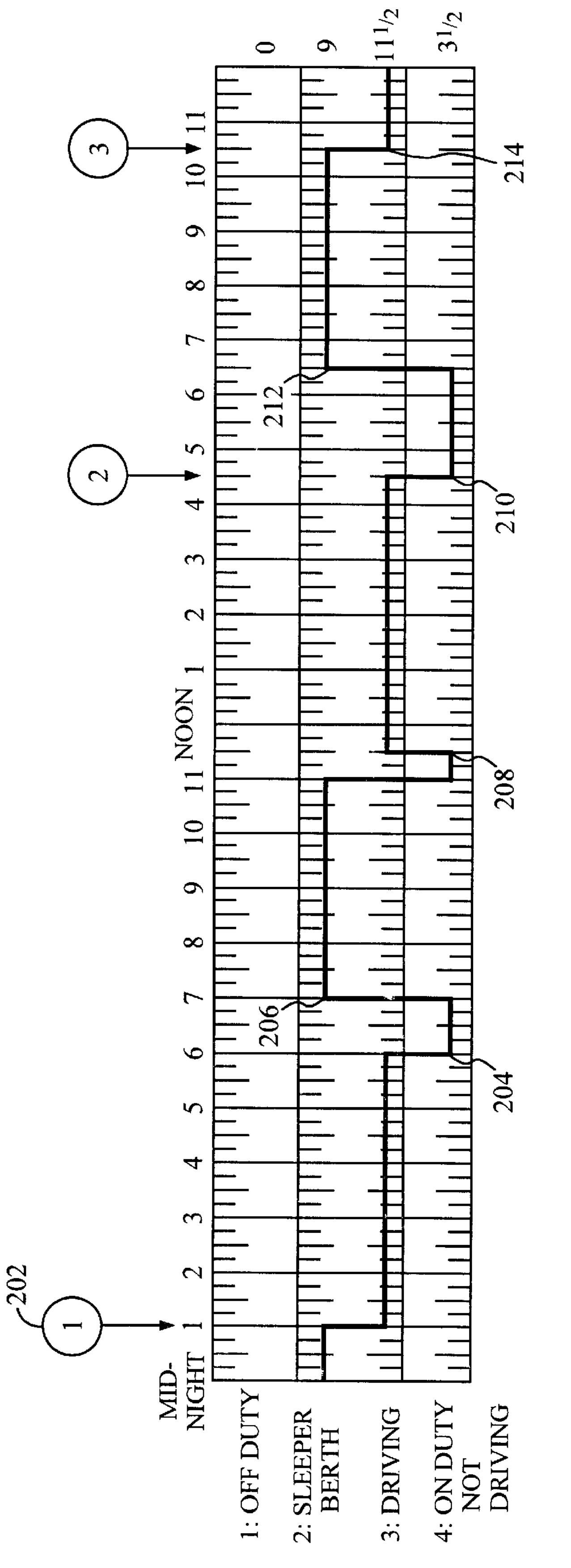
FIG. 2 illustrates a typical driver chart used in prior art logbooks.

FIG. 2 shows an example of a typical driver's chart 200. The chart is derived from the information recorded in the driver's logbook. As shown in FIG. 2, the driver emerges from a sleeper berth at 1:00 am and begins driving the vehicle, as shown as point 202. At 6:00 am the chart shows that the driver stopped driving, but remained on-duty and not-driving at point 204. The driver remained at this state until 7:00 am, when he returned to the sleeper berth to rest, shown as point 206. At 11:30 am, the driver again begins driving, shown as point 208. At 4:30 p.m., the driver stops driving, but remains on-duty, shown as point 210. At 6:30, the driver again enters the sleeper berth, shown as point 212. At 10:30 p.m., the driver once again begins driving, shown as point 214, and continues driving until at least 12:00 midnight. Once the driver's hours at each state has been charted, the total number of hours spent in each state is calculated and tallied on the right side of the chart. As shown in FIG. 2, the driver had no hours off-duty, nine hours of rest in the sleeper berth, eleven and a half hours driving, and three and a half hours on-duty, but not driving. These numbers must be evaluated against the FHWA safety regulations, as will be explained later herein.

The present invention uses the wireless communication system described above to automatically create and maintain driver activity logs. In a first embodiment, a driver uses mobile communication terminal 106 to initially enter identification information, identifying himself to mobile communication terminal 106. As the driver sends messages to central station 104, log records representing all or a portion of a delivery route are automatically created and maintained, based on the type of macro message that was transmitted, the time and date of transmission, the position of vehicle 102 at the time the message was transmitted, and previously created log records. Driver activity logs are generated by analyzing previous log records pertaining to a vehicle operator and may then be displayed at host 100, at vehicle 102, or at some other destination when desired. In a second embodiment, driver activity logs are created and maintained onboard vehicle 102.

Figure 3:
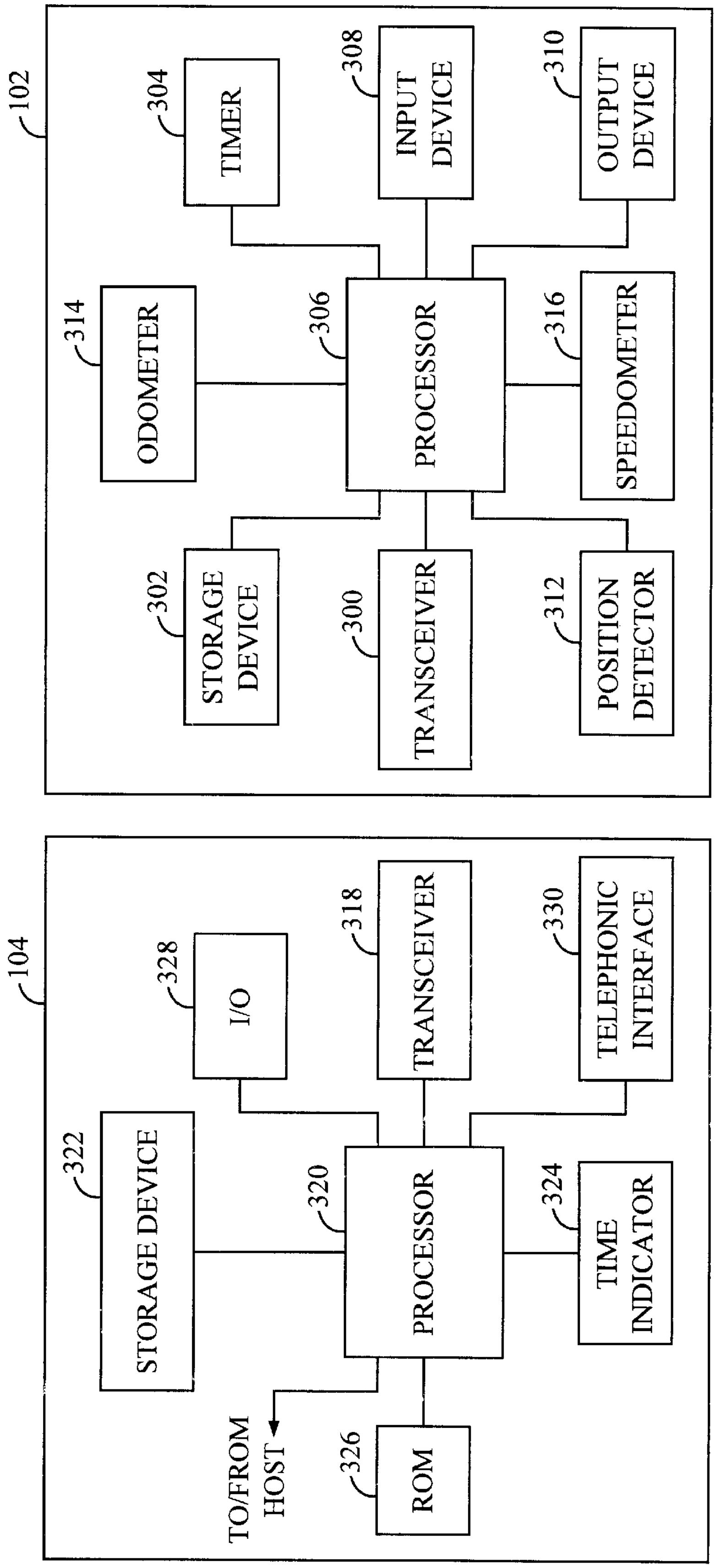
FIG. 3 illustrates a block diagram view of a mobile communication terminal and peripheral devices located on a vehicle and a central station as used in the communication system of FIG. 1.

FIG. 3 illustrates a detailed view of mobile communication terminal (MCT) 106, peripheral devices, and central station 104 as used in the first embodiment of the present invention. In this embodiment, driver activity log records are created and maintained at either central station 104 or at host 100. This embodiment minimizes the hardware and software needed on-board vehicle 102, thus minimizing hardware costs to motor carriers.

FIG. 3 shows vehicle 102 having MCT 106 and various peripheral devices. MCT 106 comprises transceiver 300, storage device 302, timer 304, and processor 306. Also shown is input device 308, output device 310, position location device 312, odometer 314, and speedometer 316. It should be understood that each vehicle in the communication system of FIG. 1 has a unique and independent MCT 106.

Prior to operating vehicle 102, a vehicle operator, or driver, identifies himself to the communication system by logging onto MCT 106 by entering a vehicle operator identification code using input device 308. A vehicle operator driving state may be entered as well at the time of the logon. The identification code is used for identifying a driver to central station 104 whenever messages or position information is transmitted to central station 104. MCT 106 can also accept more than one vehicle operator being logged on at once. This situation might occur, for example, when a pair of vehicle operators are assigned to a vehicle, driving in shifts. In this case, one driver would log on as having a vehicle operator driving state of "driving" and the other would log on as having a vehicle operator driving state of "on-duty not driving".

The vehicle operator identification code is any alphanumeric sequence which uniquely identifies the vehicle operator to the communication system. Typically, the identification code comprises a user name and a password, a driver's social security number, or an employee number. The identification code could also be represented by a number of different techniques. For example, if input device 308 is a card reading device using well-known techniques to read magnetically or optically encoded data from a card, the identification code could be encoded onto the card, then read by the card reading device. In another embodiment, input device 308 could be receptive to audible commands from a driver, such that the identification code would take the form of a word, phrase, or other audible command.

The vehicle operator driving state may also be entered at any time by a vehicle operator, such as a driver or a driving partner who is not currently operating the vehicle. In the exemplary embodiment, four vehicle operator driving states are defined, comprising a "driving" state, an "on-duty not driving" state, a "resting" state, and an "off-duty" state. The present invention automatically determines which of the above driving states a vehicle operator is in, thereby minimizing the number of explicit driving state entries required by a vehicle operator. The driving states are defined as follows.

The "driving" state refers to when a driver is actively operating a vehicle. In the case of a tractor-trailer vehicle, the driving state refers to the time when the driver is actually driving the vehicle, including necessary stops for traffic signals, stop signs, stops due to traffic jams, and so on.

The "on-duty not driving" state refers to when a driver is assigned to a vehicle, but not driving. For example, this state refers to the time when a vehicle operator is a passenger in a commercial vehicle while another driver operates the vehicle. This state can also refer to the time when a driver is at a plant, terminal, facility, or other property of a motor carrier or shipper, or on any public property, waiting to be dispatched, time spent inspecting, servicing, or conditioning a vehicle, the time spent in, or upon, a vehicle except time spent resting in a sleeper berth or driving time, the time loading or unloading a vehicle, supervising, or assisting in the loading or unloading of a vehicle, attending a vehicle being loaded or unloaded, remaining in readiness to operate the vehicle, or in giving or receiving receipts for shipments loaded or unloaded, the time spent repairing, obtaining assistance, or remaining in attendance upon a disabled commercial motor vehicle, the time spent providing a breath sample or urine specimen, including travel time to and from the collection site, in order to comply with the random, reasonable suspicion, post-accident, or follow-up testing, the time spent performing any other work in the capacity, employ, or service of a motor carrier, and, time spent performing any compensated work for a person who is not a motor carrier.

The "resting" state, otherwise known as the "rest" state or the "sleeper berth" state is when the vehicle operator is actually resting in a sleeper berth. Sleeper berths are widely used in the long-haul trucking industry for allowing drivers a comfortable rest area without having to leave the vehicle. A sleeper berth is generally part of the tractor, or cab, and frequently contains a bed, television, telephone, stereo, and other items for the comfort and relaxation of drivers. The resting state does not include time spent sleeping or resting in any other location than a sleeper berth, such as a private residence, hotel, or motel.

The "off-duty" state is when the vehicle operator is not on duty, is not required to be in readiness to work, or is not under any responsibility for performing work. The off-duty state may include time resting or sleeping in a residence, hotel, or motel, but generally does not include vacations, holidays, and other prolonged periods of time when a vehicle operator is not assigned to a vehicle.

The vehicle operator identification code and/or vehicle operator driving state is received by processor 306, and is then stored in storage device 302. Storage device 302 is typically one or more integrated circuits able to store and retrieve relatively large amounts of information. A common form of storage device 302 is a random access memory (RAM). Other types of storage devices well known in the art may be used in alternative embodiments, such as disk drives and magnetic or optical tape drives. Storage device 302 may also store information relating to the operation of MCT 106 or information relating to external electrical devices which are controlled by MCT 106.

As mentioned previously, messages are transmitted from vehicle 102 to central station 104 in the form of preformatted messages called macro messages. In the exemplary embodiment, over 50 macros are defined. Each macro is assigned a number which indicates the which macro message is being transmitted. In addition, each macro contains implicit and/or explicit information as to the driving state of the vehicle operator. For example, one macro is defined indicating that a vehicle operator has finished loading the vehicle, implying that the vehicle operator is about to begin driving. Another macro is defined which indicates that the vehicle operator has arrived at a consignee, implying that the vehicle operator is no longer driving the vehicle. Other macros contain a field which explicitly states how much time has been spent in any of the predefined driving states, i.e., driving, on duty not driving, resting, or off duty.

In the present invention, macros are grouped according to the type of macro being transmitted. For example, several macros are defined which indicate the start of a driving period. In the exemplary embodiment, one such macro indicates that a driver has received load instructions and is on his way to the given destination. Another such macro indicates that the driver has completed loading a vehicle and is about to depart from the loading location. Another group of macros define the end of a driving period. For exempla in the exemplary embodiment, a macro is defined which indicates that the driver has arrived at a destination. Another such macro indicates that the driver's vehicle has broken down.

Other macro messages convey information pertaining to the current driver state as well. For example, one macro is defined which indicates that the driver is no longer on-duty. Some macros indicate a change of driving state. For example, a macro is defined as resting, indicating that the driver is not operating the vehicle and that the driver is entering a "resting" state, rather than an "off-duty" or "on-duty not driving" state.

Messages are transmitted from MCT 106 to central station 104 using transceiver 300 and transceiver 318, respectively. Messages are downconverted and demodulated by transceiver 318, and then provided to processor 320. Processor 320 generally stores messages and corresponding information therein in storage device 322 for further processing. In one embodiment, a date and time that messages are received is stored in storage device 322, as provided by time indicator 324. In another embodiment, the date and time that a message was transmitted by MCT 106 is provided by timer 304 and appended to the message.

When messages and position reports are received by processor 320, a current vehicle operator driving state is determined using information contained within the message and/or position report, and information gathered from previous driving states, previous messages, and/or previous position reports as stored in storage device 322. After a present vehicle operator driving state is determined, a current log record is created or a previous log record is modified to include the latest information from the current message/position report. Log records are created and modified by processor 320 executing one or more software programs stored in ROM 326. ROM 326 comprises a well-known electrical storage device for storing executable software programs, such as a read-only memory (ROM), floppy disk drive, or hard disk drive.

In the exemplary embodiment, four types of log records are defined, each type corresponding to one of the predefined vehicle operator driving states, i.e. a "driving" log record, an "on-duty not driving" log record, a "resting" log record, and an "off-duty" log record. Each type of log record tracks the elapsed time that a vehicle operator has spent in the particular vehicle operator driving state, and also contains other information concerning the driving activity of a vehicle operator. In the exemplary embodiment, each log record comprises an identification code which identifies the vehicle operator, vehicle, or both, a time at which the log record was created, an end time corresponding to a time at which the particular state had ended, and an elapsed time spent by the vehicle operator at the particular driving state. A detailed description of the process of creating current log records and updating existing log records is provided later herein.

Log records are stored in storage device 322 as they are created and modified. Over time, a vehicle operator will have multiple log records stored in storage device 322, each log record corresponding to the driver's activities at a defined driving state. When a driver or other authorized person wishes to view the driver's driving status over a specified time period, a driver activity log request is provided to processor 320. The driver activity log is a summary of the elapsed time spent by the driver in each driving state as determined by the elapsed time in each log record. The driver activity log request instructs processor 320 to provide a driver activity log to the requesting party in a format as specified by the request. The driver activity log is then generated based upon the previous log records for the identified driver, as stored in storage device 322.

The driver activity log request can be generated by an authorized person at central station 104, at host 100, or by an authorized person located at vehicle 102, such as the vehicle operator. Requests generated at central station 104 are entered using I/O 328, which is typically a computer or keyboard and display. A similar I/O device is used at host 100 to generate the request. In either case, the driver activity log request is provided to processor 320, identifying a specific driver for whom a driver log is to be generated. The request could also identify a particular vehicle 102 to generate activity logs for all drivers who have operated the vehicle in the past, within a specified time period. The requested driver activity log(s) is provided to I/O 328 at central station 104, or at a similar I/O device at host 100. I/O device 328 may comprise a printer, a display device such as a computer monitor, or other well-known device for displaying the driver activity log.

If the driver activity log request was generated at vehicle 102, the driver activity log is provided to transceiver 318 and then transmitted to MCT 106. The driver activity log is then provided to output device 310, which typically comprises a display device. However, output device 310 could also comprise a printer.

The driver activity log request from vehicle 102 may contain instructions to processor 320 to provide the driver activity log to a facsimile device. In this case, a telephone number corresponding to a facsimile device to which the vehicle operator wishes to receive the formatted data entered into input device 308. The driver activity log request is transmitted to central station 104 and received by processor 320, whereupon the requested driver activity log is generated and then provided to telephonic interface 330, where it is converted to a format suitable for telephonic transmission to the telephone number associated with the facsimile device identified in the driver activity log request.

In an alternative embodiment, the vehicle operator may request transmission of the driver activity log by calling central station 104 using a conventional telephone and directing a central station representative to provide the driver activity log to a specified facsimile device. In this case, the representative requests the driver activity log using I/O 328. Processor 320 generates the driver activity log and then provides it to telephonic interface 330, where it is converted to a format suitable for telephonic transmission to the telephone number provided by the vehicle operator for the specified facsimile device.

In addition to providing driver activity logs, processor 320 also performs calculations to determine when a vehicle operator is in violation of one or more highway safety rules relating to continuous operation of a commercial vehicle. The highway safety rules in the exemplary embodiment are the FHWA rules concerning the number of hours that drivers may operate commercial vehicles over various time periods. Currently, the FHWA imposes what is commonly referred to as the 10, 15, and 70 hour rules on drivers, as explained below.

The 10, 15, and 70 hour safety rules imposed by the DOT are defined in 49 Code of Federal Regulations (C.F.R.) §395.3 as follows:

"(a) . . . no motor carrier shall permit or require any driver used by it to drive nor shall any such driver drive:

(a)(1) More than 10 hours following 8 consecutive hours off duty; or (a)(2) For any period after having been on duty 15 hours following 8 consecutive hours off duty.

(b) No motor carrier shall permit or require a driver of a commercial motor vehicle to drive, nor shall any driver drive, regardless of the number of motor carriers using the driver's services, for any period after (b)(1) Having been on duty 60 hours in any 7 consecutive days if the employing motor carrier does not operate commercial motor vehicles every day of the week; or (b)(2) Having been on duty 70 hours in any period of 8 consecutive days if the employing motor carrier operates commercial motor vehicles every day of the week."

When a driver is in violation of one of the above rules, in the exemplary embodiment the 10 hour, 15 hour, or 70 hour rule, a log violation record is created or updated if a previous record exists. As processor 320 determines a violation of any of the above rules, it determines if a previous log violation record exists for the driver in question. If a previous log violation record exists, it is updated to extend the length of the violation time period. If not, a new log violation record is created corresponding to the driver who is in violation.

When a log violation record is created or extended, an alert is generated corresponding to the violation. The alert may be sent to I/O 328 in the form of an audible or visual signal, alerting a central station operator of the violation. The alert could also be sent to a host 100 corresponding to the vehicle involved in the violation so that appropriate measures can be taken. Finally, the alert can be sent directly to the driver who generated the alert by transmitting the alert via transceiver 318 to MCT 106. The alert is received by processor 306 and displayed to the driver using output device 310. The alert may be accompanied by a message to immediately cease operating the vehicle, to contact host 100, or any number of other instructions to the driver. Furthermore, an alert may be generated at a predetermined time prior to an actual violation. This allows a driver to take necessary measures to ensure avoidance of a violation, such as pull over to a rest stop.

In addition to creating and maintaining driver activity logs and log violation records, processor 320 can also determine the number of hours that a driver can continue to operate a vehicle by creating "available hours" records from the driver log records and storing the available hours records in storage device 322. The number of hours available for drivers to continue operating vehicles is especially helpful to the motor carrier for which the driver is employed. Knowing the number of hours that each driver in its fleet can continue to drive without a safety violation, carriers can more effectively plan routes and assign drivers to vehicles based on this data.

Available hours records are calculated by using the previous driving log records over a predetermined period of time. In the exemplary embodiment, a the present day plus the previous seven days are used. The number of hours remaining for a driver to operate a vehicle is calculated for each of the three DOT driving requirements specified above. In other words, the time remaining to avoid a 10 hour, 15 hour, or 70 hour violation is calculated for each driver. If a driver is currently assigned to a vehicle when the available hours record is updated, the estimated time remaining to complete the assignment is factored into the available hours calculation to provide available hours at the time that the present assignment is completed.

Figure 4:
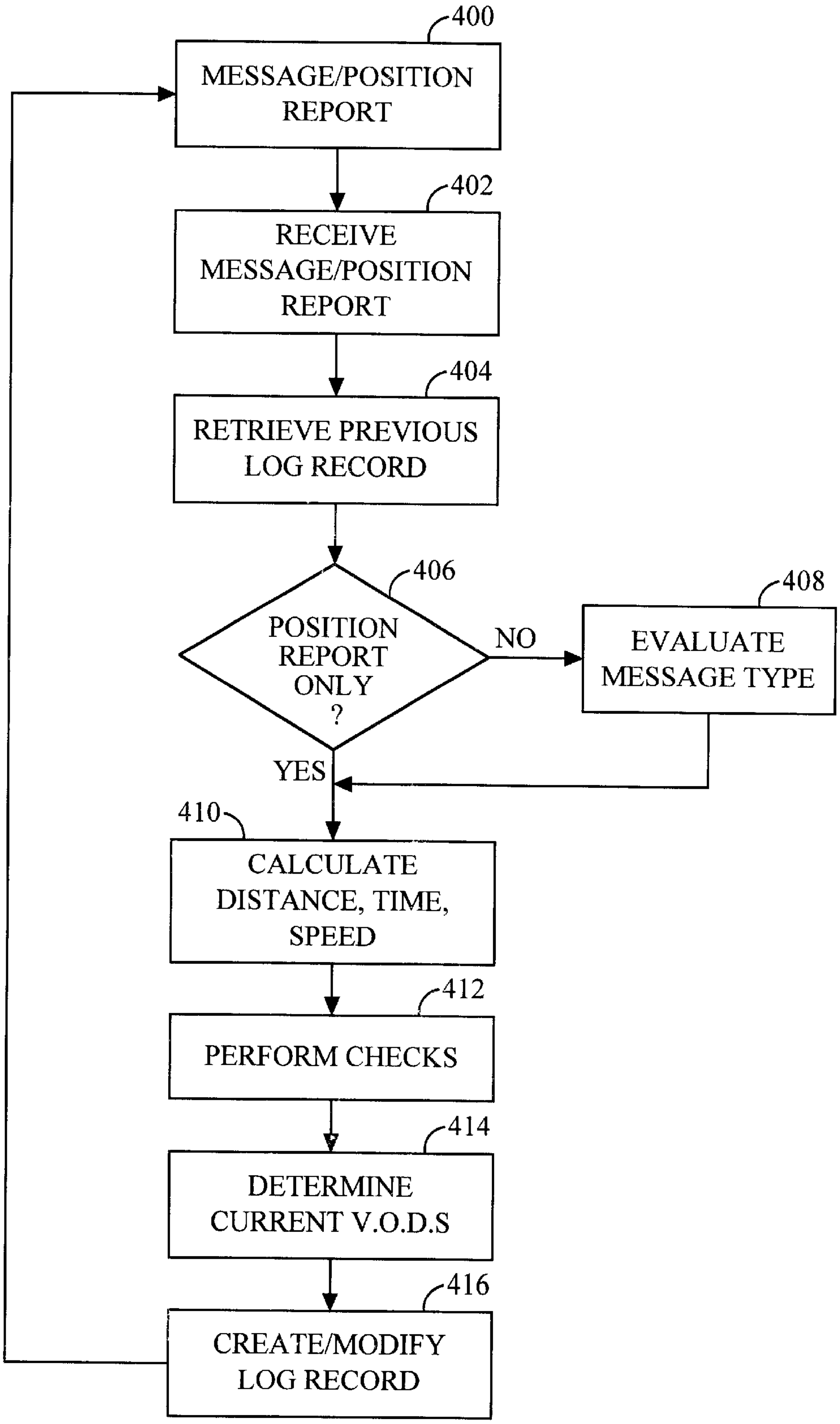
FIG. 4 illustrates the method of the present invention, shown in block diagram form.

FIG. 4 details the method of the present invention in block diagram format. A pseudo-code listing of the method of the present invention is provided for reference in appendix B. The method begins in step 400, by MCT 106 transmitting a macro message having a message type and/or a position report to central station 104. Macro messages are transmitted by a vehicle operator upon the occurrence of predetermined events, such as arrival or departure from a pick up or destination. In the exemplary embodiment, position reports are sent with each message transmitted, although they may also be transmitted independently of messages, for example at predetermined time intervals.

The transmitted message and/or position report is received at central station 104 at step 402. In step 404, a previous log record corresponding to the vehicle operator who transmitted the message/position report, is retrieved from storage device 322, if a previous log record is available. Otherwise, the last log record corresponding to the vehicle is retrieved. Each log record comprises a vehicle operator driving state, a start time indicating the date and time that the log record was created, an end time indicating the date and time that the log record was last updated, an elapsed time indicating the amount of time that a vehicle operator has spent at the driving state indicated by the log record. Other information may also be contained within each log record such as the distance traveled by vehicle 102 during the duration of the log record or an average speed of the vehicle during the duration of the log record.

As shown in step 406, if only a position report was received at central station 104, processing continues to step 410. Otherwise, if a message was received, processing proceeds to step 408, where the message is evaluated to determine the message type. Messages are transmitted in predetermined formats called macro messages in the exemplary embodiment. Over fifty macro messages are defined. Many of the macro messages are categorized into one of four message types, each message type corresponding to one of the four vehicle operator driving states. A message type is preassigned to many of the macro messages and stored in storage device 322. To determine the message type of any received message, processor 320 determines which macro has been received, i.e. by evaluating a predetermined macro identification number contained within the received message, then matches the macro identification number to the predetermined message type information stored in storage device 322.

Once the message type has been evaluated in step 408, processing continues to step 410 where a series of calculations are performed using the previous log record from step 402 and the current vehicle position and the date and time that the current vehicle position was determined. The previous log record contains information regarding the previous location of vehicle 102 and a previous date and time that the previous vehicle location was determined.

The distance traveled by vehicle 102 from the pervious vehicle position to the current position is calculated using well-known techniques in the art. The previous date and time is compared to the current date and time to determine an elapsed time between the previous vehicle position and the current vehicle position. Knowing the distance traveled by vehicle 102 during an elapsed time, the average speed of vehicle 102 may be calculated by dividing the calculated distance traveled by the elapsed time.

In step 412, the results of the distance, speed, and time calculations of step 412 are evaluated to determine suspect results. For example, a calculated average speed of 120 miles per hour is deemed to be unrealistic. In the exemplary embodiment, a minimum and maximum speed is defined, as well as a minimum and maximum distance over a predetermined time period. In a first case, if the calculated average speed of vehicle 102 falls between the minimum and maximum speed, the calculations are considered to be valid, and processing continues to step 414. In a second case, if the calculated average speed of vehicle 102 exceeds the maximum speed, the elapsed time is re-calculated to by dividing the distance traveled by the predetermined maximum speed.

In a third case, if the calculated speed is less than the minimum speed, either a driver's average speed or an average state speed is used to re-calculate the elapsed time. A driver's average speed is generally stored in storage device 422, representing an average speed over a predetermined time period. A state average speed is generally a fixed speed stored in storage device 322 which represents an average expected speed for vehicle traveling on a particular state's highways. If a driver average speed is not available, the state average speed is used to re-calculate the elapsed time.

The elapsed time result from step 412 is used in steps 414 and 416 to determine the current vehicle operator driving state and the elapsed time attributed to the determined driving state. In the first and second cases, above, if the current message type indicates a "start" macro and the current vehicle position is less than a predetermined distance from the previous vehicle position, the vehicle operator driver state is determined to be "driving", a new log record is created to reflect the "driving" state, the log record comprising a start time equal to the current time, an end time equal to the start time, and an elapsed time of zero, since the new log record reflects the assumption that a driver has just begun to operate the vehicle. Again in the first and second cases, if the current message type indicates a "start" macro and the current vehicle position is more than a predetermined distance from the previous vehicle position, then the driver is assumed to have been operating the vehicle for the entire distance traveled since the previous vehicle position, and a new log record is created to reflect the "driving" state, the log record comprising a start time equal to the end time of the previous log record, an end time equal to the current time, and an elapsed time equal to the difference between the start time and the end time.

In the third case, where the calculated average speed of the vehicle is less than the minimum speed, it is assumed that the driver was not continuously operating the vehicle between the current position and the pervious position. In this case, two log records are created, a "driving" log record and an "off-duty" driving record. The re-calculated average speed is used along with the calculated distance to determine an estimated elapsed time that the driver was actually operating the vehicle. A new "driving" log record is created having an end time equal to the current time, an elapsed time equal to the estimated elapsed time, and a start time equal to the end time minus the estimated elapsed time. Furthermore, a new "off-duty" log record is created having a start time equal to the end time of the previous driving record or position report, an end time equal to the start time of the newly-created "driving" log record, and an elapsed time equal to the difference between the start time and the end time of the "off-duty" log record.

Again in steps 414 and 416, if the transmitted message type indicates an "on-duty not driving" or an "off-duty" message, the previous log record is modified to reflect that the driver is no longer operating the vehicle, and the previous log record end time and elapsed time is changed to reflect the current time. A current "on-duty not driving" log record or an "off-duty" log record is also created, depending on the message type, the log record having a start time equal to the current time, an end time equal to the start time, and an elapsed time equal to zero.

If no message was transmitted by the vehicle operator, and steps 414 and 416 are the result of a position report being transmitted only, the distance traveled from the previous position report (or previous log record) is used to determine the vehicle operator driving status of the driver. If a predetermined minimum distance has been traveled between the previous position and the current position, the driver is assumed to have been in the "driving" state for at least part of the time. The speed, distance, time, and estimated elapsed times as calculated in steps 410 and 412 are used to create new log records or modify a previous log record depending on the result of these steps.

Turning now to a second embodiment of the present invention, driver logs are created and maintained onboard vehicle 102 rather than at central station 104. This provides the advantages of reduced messaging costs and less cost and complexity at central station 104.

Referring to FIG. 3 once more, the second embodiment uses much of the same components onboard vehicle 102 as the first embodiment. However, in the second embodiment, there is no need for many of the components found in central station 104, since the computational functions of the present invention are carried out onboard vehicle 102 using processor 306.

In the second embodiment, a driver begins operating vehicle 102 by entering an identification code into MCT 106 using input device 308. MCT 106 can accept more than one vehicle operator being logged on at once. If more than one vehicle operator logs onto MCT 106, a vehicle operator driving state is entered as well, identifying which operator is going to actually drive vehicle 102 and which one will be "on-duty not driving". The vehicle operator identification code is any alpha-numeric sequence which uniquely identifies the vehicle operator to the communication system. Typically, the identification code comprises a user name and a password, or simply a driver's social security number. The identification code could also be represented by a number of different techniques, as discussed above.

The vehicle operator identification code(s) and/or vehicle operator driving state is stored in storage device 302. When an operator logs onto vehicle 102 and identifies himself as currently operating the vehicle, processor 306 creates a log record with a state of "driving", including a start time equal to the date and time that the logon was received, an end time equal to the start time, an elapsed time equal to zero, and the present vehicle position as provided by position location device 312. Other information which may be recorded includes a current odometer reading as provided by odometer 314 or a current vehicle speed as provided by speedometer 316. If a second driver logs on and identifies himself as "on-duty not driving", a log record reflecting this state is created by processor 306 and stored in storage device 302. The "on-duty not driving" log record comprises a start time, an end time, and an elapsed time. When an "on-duty not driving" record is created, the start time is equal to the time when the record was created, as provided by timer 304, and the end time is equal to the start time, the elapsed time calculated to be zero. As log records are updated along a route of travel, the end time and elapsed time is changed to reflect the updated status.

As messages are transmitted by the vehicle operator during a travel route, or upon a determination of the vehicle position, processor 306 either creates a current log record or modifies a previous log record according to the message type, the current vehicle position as provided by position detector 312, a current date and time as provided by timer 304, a previous vehicle position, and a previous date and time that the previous vehicle position was determined. Upon the occurrence of a position update only (i.e., no accompanying message), an existing (i.e. previous) log record is modified by equating the end time to be equal to the time that the position update was received by processor 306, and the elapsed time and miles driven are then updated. If a message is transmitted and is of a message type which indicates that the vehicle has stopped, processor 306 updates the current log record to reflect that the vehicle operator is no longer in the "driving" state by updating the end time with the time that the "stopped driving" message type was transmitted. The elapsed time that the vehicle operator was actively driving the vehicle is then calculated. Processor 306 also updates the total miles driven as indicated by the difference between the start position and the final position as determined by position location device 312 or the total mileage driven could be determined by calculating the difference between the initial odometer reading and the current odometer reading at the time the message was sent. Other information could also be calculated such as an average vehicle speed during the driving period attributed to the current vehicle operator.

When processor 306 has determined that a vehicle operator is no longer operating the vehicle, the previous driving record is modified as described above, and a current driving record is created, having a vehicle operator driving state equal to either "on-duty not driving", resting, or off-duty. Processor 306 determines which type of driving record to create based on the message type, vehicle position, current time, and/or explicit information provided within the message itself.

An "on-duty not driving" log record is created if processor 306 detects that a message of a certain type has been sent by the vehicle operator. Several macro messages may contain a field for a vehicle operator to fill out, indicating the number of hours spent "on-duty not driving". Such activities may occur, for example, when a vehicle operator is loading or unloading a vehicle, or when a driver has departed from a stop. Macros messages which contain a field for entering "on-duty not driving" time are predetermined so that when one of these messages are sent by a vehicle operator, processor 306 knows to seek out the "on-duty not driving" time. In the exemplary embodiment of the present invention, if the "on-duty not driving" field is left blank, a default time period is inserted by processor 306 equal to fifteen minutes. Of course, other embodiments could use an alternative default time period.

In addition to certain macro messages containing a field for logging "on-duty not driving", other macro messages are predefined which explicitly state "on-duty not driving" activity. The activities which fall under this category are generally those which require a consistent amount of time for a driver to perform. In the exemplary embodiment, a single macro message is defined which allows a driver to chose which activity has occurred, comprising fuel purchasing, stopped at a weigh station (commonly referred to as "scales"), performing a visual inspection of a load or on vehicle 102 (such as a tire inspection), and stopping for a DOT vehicle inspection. A predetermined amount of time is allotted to the above activities, unless the vehicle operator enters a greater time.

In general, a "resting" log record is created if vehicle 102 has remained at a single location or more than a predetermined time period, in the exemplary embodiment, 2 hours. The location of vehicle 102 is determined at predetermined time intervals, in the exemplary embodiment, one hour. The vehicle position is provided by position location device 312 to processor 306 and transmitted to central station 104 at predetermined time intervals. If no activity is detected at vehicle 102, i.e. no messages are transmitted and the vehicle position remains at a single location (within some predetermined distance), processor 306 creates a "resting" log record for the vehicle operator who was last operating vehicle 102. The "resting" driving record comprises a start time equal to the time that vehicle 102 was first reported at the single location, and an end time equal to the time that the resting driving record was created. An elapsed resting time can be calculated from the start time and the end time and stored within the "resting" driving record. If subsequent position reports indicate further inactivity, the "resting" driving record is extended by modifying the end time to the time that the last position indication was received by processor 306.

An "off-duty" driving record is created when vehicle 102 has remained at a single location for less than a predetermined time period, in the exemplary embodiment, 2 hours. The "off-duty" driving record is created in much the same way as the "resting" driving record, explained above.

Log records may be altered by a vehicle operator at any time by entering a change request using input device 308. Generally, changes to a "driving" log record are not permitted. Therefore, only changes to the "on-duty not driving", "resting", and "off-duty" log records are allowed. Typically, a driver can specify a driving state and the date and times spent at the specified driving state. For example, if a driver forgets to inform MCT 106 that he had stopped driving vehicle 102 spent the previous 8 hours sleeping in a sleeper berth, the driver can enter this information into MCT 106 using input device 308, specifying that he was in the "resting" state for eight hours, beginning at a specified start time and ending at a specified end time. In an alternative embodiment, only the start time and the elapsed time, i.e. 8 hours in this example, are entered. The driver may also need to enter his identification code along with the state change information.

When processor 306 receives a change request, it checks storage device 302 for the last log record corresponding to the specified vehicle operator. In an alternative embodiment, the last vehicle operator to record a log record is assumed to be entering the state change request.

In the exemplary embodiment, change requests are only permitted for a predetermined amount of time prior to initiation of the change request. For example, in one embodiment, a change request is accepted by processor 306 if it seeks to modify a log record which is less than 24 hours old. In the exemplary embodiment, change requests are acceptable up until midnight of each day for changes to log records created or extended during that day.

At any time, a driver can request a driver activity log, referred to as a driver activity log request, which provides a summary of the driver's activities over a given time period. The driver activity log may be required to prove compliance with safety regulations during a DOT inspection, when requested to do so for a peace officer, or simply to view an operator's log records to ensure accuracy. The driver activity log request is entered by a vehicle operator using input device 308 or it can be entered by authorized personnel located at host 100 or central station 104 by issuing the activity request via transceiver 318 to MCT 106. In either case, information regarding the driver's prior driving activities is formatted to comply with rules promulgated by the regulatory agency, in this case, the DOT and/or FHWY. In another embodiment, the vehicle operator or authorized personnel, can request the activity information in a customized format, tailored to the needs of the individual requesting the data.

The driver activity log is generally provided to output device 310 if the activity request was received from input device 308. If the activity request was received from transceiver 300, the driver activity log is generally transmitted to central station 104 and presented to I/O 328, or forwarded to host 100 for display, storage, or for further calculations. In addition to displaying information to output device 310, I/O 328, or at host 100, the driver activity log can also be provided to a facsimile device by a request from the vehicle operator or by authorized personnel at host 100 or central station 104. Generally, a facsimile request to provide the formatted data to a facsimile device is initiated by a vehicle operator, the request entered using input device 308 including a telephone number corresponding to a facsimile device to which the vehicle operator wishes to receive the driver activity log. The facsimile request is received by processor 306 whereupon the driver activity log is transmitted to central station 104. Central station 104 receives the driver activity log and provides it to telephonic interface 330, where it is converted to a format suitable for telephonic transmission to the telephone number provided by the vehicle operator.

In an alternative embodiment, the vehicle operator initiates a driver activity log request specifying a facsimile telephone number to deliver it to by calling central station 104 using a conventional telephone and directing a central station representative to provide the driver activity log to a specified facsimile device. In this case, the representative takes steps to contact MCT 106 and retrieve the driver activity log. Upon receipt of the driver activity log request from central station 104, processor 306 calculates the driver activity log, and transmits it to central station 104. The driver activity log is received by central station 104 and provided to telephonic interface 330, where it is converted to a format suitable for telephonic transmission to the telephone number provided by the vehicle operator.

In the exemplary embodiment, shown in FIG. 5, the driver activity log comprises a vehicle operator identification number, such as a social security number or employee number, a date and time that the data was provided, a listing of each driving record for the day, beginning at midnight, each driving record including a start time, end time, elapsed time, distance traveled by vehicle 102 during each driving record, a total time spent at each of the four driving states for the day (i.e. driving, on-duty not driving, resting, or off-duty), and a total distance traveled by vehicle 102 for the day. Also provided are previous day on-duty totals for the previous eight days for compliance with the 70 hour rule, discussed above. The on-duty total for each day is calculated by adding the elapsed time for driving and on-duty not driving records for each day. In another embodiment, the time at each of the four driving states is converted into a graphical format, similar to the prior art graph as shown in FIG. 2.

In addition to initiating an driver activity log request, a driver log violation report may also be requested by the vehicle operator, or authorized personnel at either host 100 or central station 104. A violation report request initiated by the vehicle operator is entered using input device 308 and received by processor 306 while a violation report request initiated at host 100 or central station 104 is transmitted to MCT 106 and received by processor 306 the log violation request comprises instructions to processor 306 on which information is to be displayed and how to format the information. For example, log violations between specified dates may be requested, or log violations by type (i.e. 10 hour, 15 hour, or 70 hour) may be requested. If the log violation request is initiated by the vehicle operator, a log violation report is typically displayed to the vehicle operator through output device 310. If the log violation request is initiated by an authorized user at host 100 or central station 104, the log violation report is calculated by processor 306 and transmitted to central station 104 and host 100, as the case may be. The log violation report may then be displayed and analyzed at either location. An another embodiment, a log violation request generated by a vehicle operator may contain instructions to processor 306 to forward the log violation report to a telephone number corresponding to a facsimile device. In this case, the log violation request is received by processor 306 which creates the log violation report from log violation records stored in storage device 302, then the log violation report and facsimile telephone number is transmitted to central station 104. Once received by processor 320 at central station 104, the log violation report is provided to telephonic interface 330 where it is converted into a format suitable for a facsimile device, then sent to the facsimile device corresponding to the provided facsimile telephone number.

When a violation report request is received by processor 306, the log violation records, if any, are retrieved from storage device 302 and the log violation report is created from the violation records, formatted in accordance with the log violation request. In another embodiment, the log violation report is generated from log records only, not by any previously existing log violation records. Formatting examples include generating a log violation report only for those log violations in excess of one hour in duration. Or only violations pertaining to a single driver may be requested. The log violation report comprises any violations between the specified times in the log violation request, the length of time of the violation, and the violation type. A trip identification number may also be displayed indicating a pick up and delivery travel route during which the violation was recorded.

In addition to requesting log violation reports, an "available hours" report may also be requested by the vehicle operator or by authorized personnel at host 100 or central station 104. The available hours report shows how much time a vehicle operator may operate a vehicle without violating safety regulations relating to driving time. Whenever a driving record or an on-duty not driving record is updated, the elapsed time calculated for the entry is subtracted by processor 306 from the time remaining to avoid a violation. For example, in the exemplary embodiment, driver's must comply with a 10 hour rule, a 15 hour rule, and a 70 hour rule, which limits the number of hours that a driver may operate a vehicle over a predetermined time period. As the elapsed driving time is updated by processor 306, the time remaining for each of the three rules are updated, generally by subtracting the elapsed time from the drive time remaining for each rule.

If a driver is in danger of violating any of the safety regulations relating to driving time, an alert may be sent to the driver, or to host 100, alerting him that a driving violation will occur shortly. The alert may be displayed by audio or visual warning using output device 310.

The method of the second embodiment of the present invention is substantially similar to the flowchart of FIG. 4.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for creating and maintaining a driver activity log for a vehicle operator, said vehicle operator in communication with a central station using a mobile communication terminal located onboard a vehicle, said driver activity log showing the elapsed time that said vehicle operator has spent in each of several vehicle operator driving states, the method comprising the steps of:

pre-assigning one of a number of message types each to a number of message identification codes, each of said message types corresponding to a vehicle operator status, each of said message identification codes corresponding to a particular formatted message out of a number of formatted messages;

receiving a formatted message from said vehicle, said formatted message comprising one of said number of message identification codes;

evaluating said message identification code to determine which of said pre-assigned message types said formatted message has been assigned; and determining a current vehicle operator status based on said determined message type.

2. The method of claim 1 further comprising the steps of:

creating a current log record based upon said current vehicle operator status and a previous log record in a storage device;

modifying said previous log record based upon said current vehicle operator status and said previous log record in said storage device; and storing said log records in said storage device.

3. The method of claim 2 further comprising the steps of:

creating said driver activity log, using said log records, upon receipt of a driver activity log request, said driver activity log showing the elapsed time that said vehicle operator has spent in each of said several vehicle operator states; and providing said driver activity log to an output device.

4. The method of claim 3 wherein the step of providing said driver activity log to an output device comprises the steps of:

transmitting said driver activity log from said central station to said vehicle;

receiving said driver activity log at said vehicle; and providing said driver activity log to said output device.

5. The method of claim 3 wherein the step of providing said driver activity log to an output device comprises the steps of:

providing said driver activity log from said central station to a telephonic interface as specified by said driver log activity request;

transmitting said driver activity log from said telephonic interface to a remote facsimile device as specified by said driver activity log request.

6. The method of claim 2 wherein said current log record comprise said vehicle operator status, a start time, an end time, and an elapsed time that said vehicle operator has been in said current vehicle operator driving state.

7. The method of claim 1 further comprising:

determining a current vehicle location and a date and time that said current vehicle position was determined and providing said current vehicle location and said date and time to said central station; and determining said current vehicle operator status based on said message type, said current vehicle position, and said date and time that said current vehicle position was determined.

8. The method of claim 7, wherein the step of determining said current vehicle operator status further comprises determining said current vehicle operator status based on said message type, said current vehicle position, said date and time that said current vehicle position was determined, a previous vehicle position, and a date and time that said previous vehicle position was determined.

9. An apparatus for creating and maintaining a driver activity log for a vehicle operator, said vehicle operator in communication with a central station using a mobile communication terminal located onboard a vehicle, said driver activity log showing the elapsed time that said vehicle operator has spent in each of several vehicle operator states, comprising:

a storage device for storing a pre-assigned message identification code and a corresponding vehicle operator status;

a transceiver for receiving a formatted message from said vehicle, said formatted message comprising said message identification code; and a processor connected to said transceiver and to said storage device for determining a current vehicle operator status by evaluating said message identification code to determine said corresponding pre-assigned vehicle operator status.

10. The apparatus of claim 9 wherein said processor is further for creating a current log record based upon said current vehicle operator status and said storage device is further for storing said current log record.

11. The apparatus of claim 10 further comprising:

an input device for entering a driver activity log request, said driver activity log showing the elapsed time that said vehicle operator has spent in each of said several vehicle operator statuses; and an output device for displaying said driver activity log;

wherein said driver activity log is created by said processor using said log records stored in said storage device.

12. The apparatus of claim 9 further comprising:

a position location device for determining a current location of said vehicle;

a timer for determining a date and time that said current vehicle position was determined;

a storage device for storing said current vehicle position, and said date and time that said current vehicle position was determined; wherein said processor is further for determining said current vehicle operator status based on said message type, said current vehicle position, and said date and time that said current vehicle position was determined.

* * * * *